US012785536B2

(12) United States Patent
Petrina et al.

(10) Patent No.: US 12,785,536 B2
(45) Date of Patent: Nov. 3, 2026

(54) CONTROL UNIT AND METHOD FOR PROVIDING HYSTERETIC CURRENT MODE CONTROL FOR POWER CONVERTER

(71) Applicant: Renesas Design (UK) Limited, Bourne End (GB)

(72) Inventors: Gaetano Maria Walter Petrina, Germering (DE); Mark Childs, Germering (DE); Eduardas Jodka, Germering (DE); Stefan Dietrich, Germering (DE)

(73) Assignee: Renesas Design (UK) Limited, Bourne End (GB)

( * ) Notice: Subject to any disclaimer, the term of this patent is extended or adjusted under 35 U.S.C. 154(b) by 204 days.

(21) Appl. No.: 18/775,880

(22) Filed: Jul. 17, 2024

(65) Prior Publication Data

US 2026/0025053 A1 Jan. 22, 2026

(51) Int. Cl.
*H02M 3/158* (2006.01)
*H02M 1/00* (2006.01)

(52) U.S. Cl.
CPC ......... *H02M 1/0025* (2021.05); *H02M 3/158* (2013.01)

(58) Field of Classification Search
CPC ............... H02M 1/003; H02M 1/0025; H02M 3/158–1588; H02M 3/156–1566
See application file for complete search history.

(56) References Cited

U.S. PATENT DOCUMENTS

| | | | | |
|---|---|---|---|---|
| 10,461,639 | B1 * | 10/2019 | Childs | H03K 4/48 |
| 2012/0105030 | A1 * | 5/2012 | Chen | H02M 3/156 323/271 |
| 2015/0200593 | A1 * | 7/2015 | Stoichita | H02M 3/158 323/271 |
| 2023/0421039 | A1 * | 12/2023 | Castorina | H02M 1/0025 |

* cited by examiner

*Primary Examiner* — Alex Torres-Rivera

(74) *Attorney, Agent, or Firm* — SCULLY, SCOTT, MURPHY & PRESSER, P.C.

(57) ABSTRACT

A control unit for operating a switched power converter is provided. The control unit is configured to provide an output voltage at an output node in dependence of an input voltage at an input node using a switching network which is configured to operate an inductance in a first state and in a second state is described. The current through the inductance exhibits a first slope in the first state and a second slope in the second state. The control unit is configured to generate a first reference, to determine slope information, to determine a hysteretic offset and a ramp slope of a ramp signal based on the slope information, to generate a second reference based on the first reference, to provide a current signal which is indicative of the current through the inductance, and to cause the switching network to put the inductance into the first state.

20 Claims, 6 Drawing Sheets

CONTROL UNIT AND METHOD FOR PROVIDING HYSTERETIC CURRENT MODE CONTROL FOR POWER CONVERTER

TECHNICAL FIELD

The present document relates to operating a power converter using a hysteretic current mode control scheme. In particular, the present document relates to a method and a corresponding control unit for performing a hysteretic current mode control of a power converter.

BACKGROUND

The hysteretic current mode control of a DC-DC power converter may exhibit a switching frequency inaccuracy and/or drift which may be due to the change of one or more parameters, such as a delay, an offset, the resistance of a power switch, and/or which may be due to process, temperature, voltage and/or load conditions. A power converter, such as a Buck, a Boost, and/or an Inverting Buck-Boost converter, may make use of a frequency-locked-loop (FLL) digital or hybrid circuit to adjust the switching frequency at steady state and to keep the switching frequency fixed at a pre-determined frequency.

A digital FLL typically exhibits a relatively complex architecture that includes synchronizers, deglitches and/or filters, counters, state machines, accumulators, and a DAC. Hence, a digital FLL typically adds complexity to the power converter circuit. Furthermore, a digital FLL may slow down simulations and may increase difficulties for modeling the power converter during development (because it may be driven by a clock which typically has a frequency higher than the switching frequency of the DC-DC power converter). Furthermore, the presence of a high frequency clock (oscillator) may increase power consumption and noise. Moreover, a FLL typically requires a certain number of cycles for locking to the target value of the switching frequency. In other words, the FLL typically has a certain limited bandwidth for ensuring stability of the voltage loop, such that the number of cycles for locking to the target frequency cannot be reduced below a certain number in order to avoid voltage loop instability.

The present document addresses the technical problem of providing a robust, an accurate and an efficient frequency control scheme for hysteretic current mode control having a fast settling time.

The technical problem is solved by each one of the independent claims. Preferred examples are described in the dependent claims.

SUMMARY

According to an aspect, a control unit for operating a switched power converter configured to provide an output voltage at an output node in dependence of an input voltage at an input node using a switching network which is configured to operate an inductance in a first state and in a second state is described. The current through the inductance exhibits a first slope in the first state and a second slope in the second state. The control unit is configured to generate a first reference based on the output voltage and based on a reference voltage; to determine slope information with respect to the first slope and/or the second slope; to determine a hysteretic offset and a ramp slope of a ramp signal based on the slope information; to generate a second reference based on the first reference, based on the hysteretic offset and based on the ramp signal; to provide a current signal which is indicative of the current through the inductance; to cause the switching network to put the inductance into the first state, if the current signal reaches the first reference; and to cause the switching network to put the inductance into the second state, if the current signal reaches the second reference.

According to another aspect, a method for operating a switched power converter configured to provide an output voltage at an output node in dependence of an input voltage at an input node using a switching network which is configured to operate an inductance in a first state and in a second state is described, wherein a current through the inductance exhibits a first slope in the first state and a second slope in the second state. The method comprises generating a first reference based on the output voltage and based on a reference voltage; determining slope information with respect to the first slope and/or the second slope; determining a hysteretic offset and a ramp slope of a ramp signal based on the slope information; generating a second reference based on the first reference, based on the hysteretic offset and based on the ramp signal; providing a current signal which is indicative of the current through the inductance; causing the switching network to put the inductance into the first state, if the current signal reaches the first reference; and causing the switching network to put the inductance into the second state, if the current signal reaches the second reference.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

SHORT DESCRIPTION OF THE DRAWINGS

The invention is explained below in an exemplary manner with reference to the accompanying drawings, wherein FIG. 1A illustrates an example power converter with a control unit for performing hysteretic current mode control using a peak current reference;

DETAILED DESCRIPTION

As indicated above, the present document addresses the technical problem of controlling the switching frequency in hysteretic current mode control of a DC-DC power converter in an efficient, precise, robust and fast manner. In this context, a control unit is described which comprises a sawtooth generator for generating a ramp signal having a ramp slope that is proportional to a certain voltage and/or frequency set by a clock. The control unit further comprises a circuit that generates the hysteretic offset (which is used for the hysteretic current mode control), wherein the hysteretic offset may be proportional to and/or may be a function of a certain voltage. The voltage dependency may be defined as given by the Table 1.

Figure 1A:
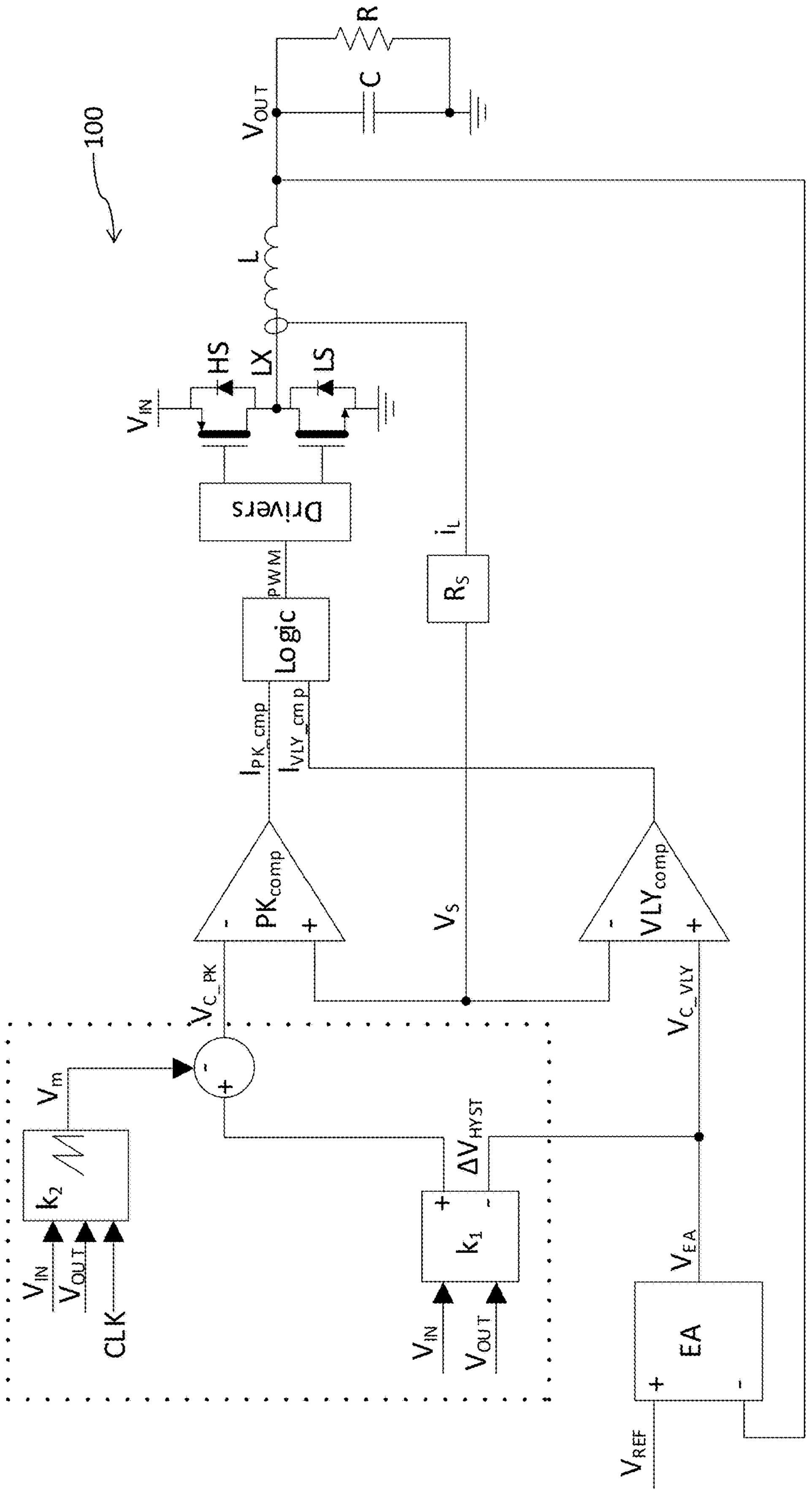
FIG. 1B illustrates an example power converter with a control unit for performing hysteretic current mode control using a valley current reference.
Figure 1B:
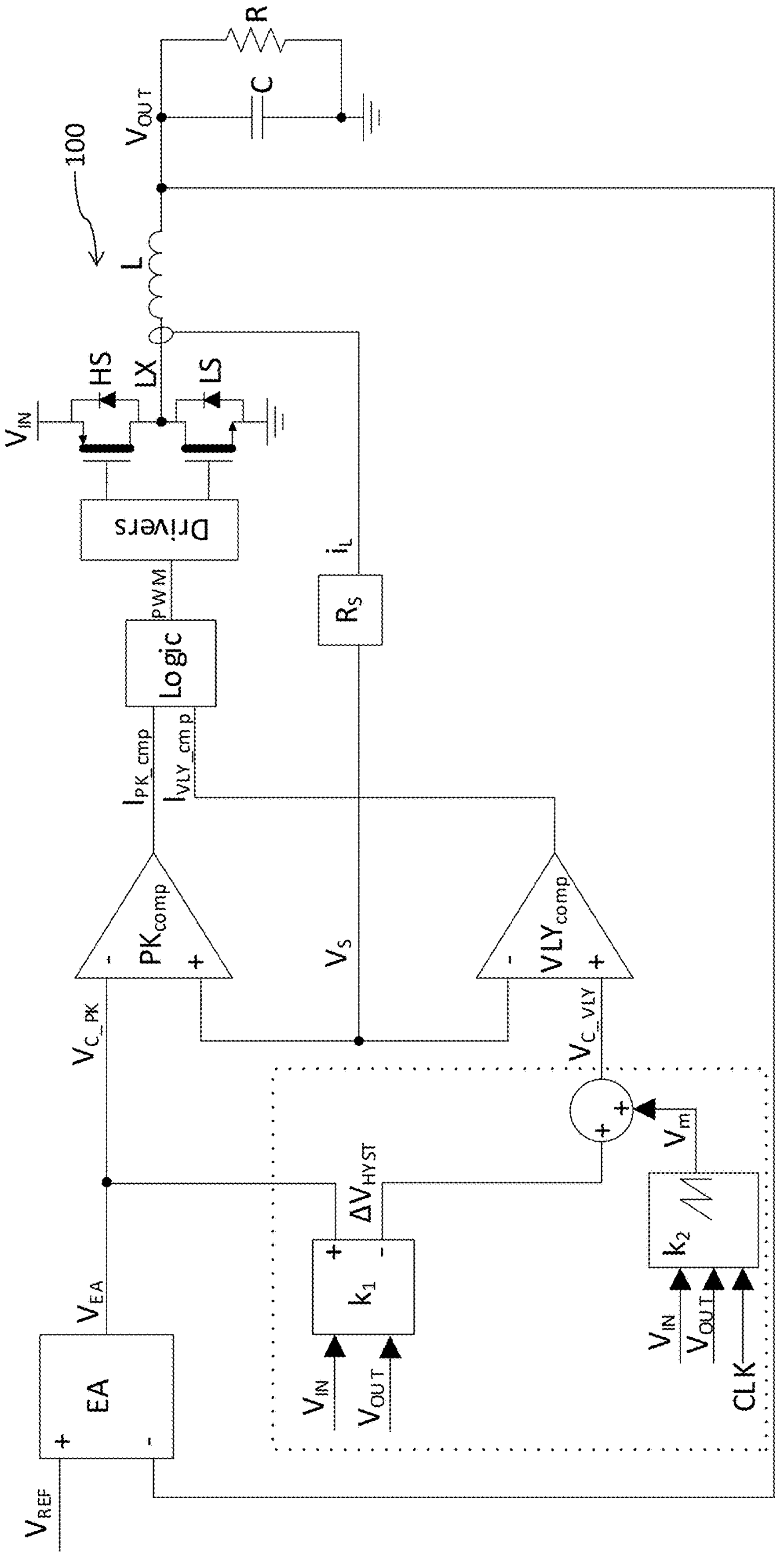

In FIGS. 1A and 1B a buck converter with hysteretic current mode control is shown as an example of a generic DC-DC power converter 100. The power converter 100 comprises a hysteretic comparator which in the illustrated case is implemented using a peak comparator $PK_{comp}$ and a valley comparator $VLY_{comp}$. The peak comparator and/or the valley comparator have an input to which a hysteretic voltage $\Delta V_{HYST}$ (i.e., the hysteretic offset) is applied. The hysteretic voltage may be proportional to the output voltage $V_{OUT}$ of the power converter 100.

The power converter 100 further comprises a ramp generator which is configured to generate a ramp signal $V_m$ with a certain ramp slope. In an example the ramp slope of the ramp signal is equal to the demagnetizing slope of the inductor current. Alternatively, or in addition, the ramp slope of the voltage ramp may be proportional to the output voltage $V_{OUT}$ of the power converter 100.

A clock signal CLK at the target value of the switching frequency fs may be used to start the ramp signal.

By introducing a ramp signal at the target value of the switching frequency into the control of the power converter 100, it may be achieved that the power converter 100 follows the target value of the switching frequency in a precise and robust manner.

In the example of FIG. 1A, the error signal $V_{EA}$ which is provided by the error amplifier is applied on the valley control side, i.e. to the valley comparator. The artificial ramp signal is subtracted from the hysteretic voltage $\Delta V_{HYST}$ on the peak control side. The inductor current $I_L$ may be sensed at the inductor L and may be converted to a voltage $V_s$ using the transresistance $R_s$. The voltage signal $V_s$ is indicative of the inductor current and may therefore be referred to as the inductor current signal.

The voltage signal $V_s$ is compared to the peak reference $V_{C\_PK}$ using the peak comparator and is compared to the valley reference $V_{C\_VLY}$ using the valley comparator. In the power converter 100 of FIG. 1A, the valley reference is set directly by the error signal $V_{EA}$ which is provided by the error amplifier. In particular, the valley reference may be equal to the error signal (in the example of FIG. 1A).

The peak reference may be dependent on the difference between the error signal $V_{EA}$ which is shifted by the hysteretic voltage $\Delta V_{HYST}$ and the ramp signal $V_m$. In particular, the peak reference $V_{C\_PK}$ may be given by: $V_{C\_PK}=V_{EA}+\Delta V_{HYST}-V_m$.

Figure 2A:
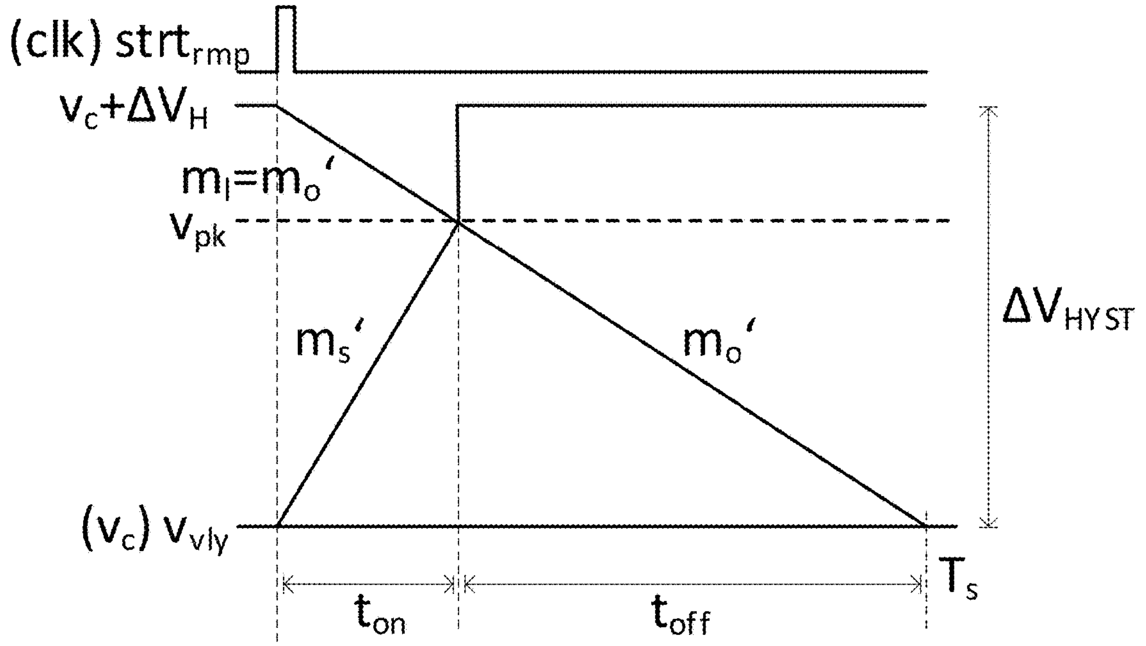
FIGS. 2A and 3A show example waveform diagrams for the power converter of FIG. 1A.

The ramp signal may be generated such that its ramp slope $m_1$ is equal to the slope of the inductor current during demagnetization, i.e. the slope $m_1$ may be proportional to $V_{OUT}$. As illustrated in FIG. 2A, the clock signal clk, running at the target switching frequency $f_s$, starts the ramp signal periodically. When the inductor current ramps up, the inductor current signal $V_s$ ramps up accordingly until the inductor current signal $V_s$ reaches the peak reference $V_{C\_PK}$, by intercepting the added ramp. This condition causes the output $I_{PK\_cmp}$ of the peak comparator $PK_{comp}$ to trigger. The logic unit then forces the PWM signal Low, which causes the electronic switch HS to be turned off and the electronic switch LS to be turned on (via the driver circuit). As a result of this, the inductor current decreases with a certain slope $m_o$ and when its sensed version $V_S$ reaches the valley reference $V_{c\_VLY}$, the output $I_{VLY\_cmp}$ of valley comparator $VLY_{comp}$ triggers. The logic unit then forces the PWM signal high, which turns off the electronic switch LS and which turns on the electronic switch HS. This process is repeated periodically at the target frequency $f_s$.

The waveform representation of FIG. 2A shows the sensed inductor current $V_S$ having a ripple $\Delta$Vr. Furthermore, FIG. 2A shows the added ramp signal having the slope $m_1$ and the clock clk that starts the added ramp signal. In FIG. 2A $v_c$ indicates the error signal $V_{EA}$. Furthermore, the hysteretic voltage $\Delta V_{HYST}$ is indicated by $\Delta V_H$. The peak reference $V_{C\_PK}$ is indicated by $v_{pk}$, and the valley reference $V_{C\_VLY}$ is indicated by $v_{vly}$.

The added ramp signal with the slope $m_1$ that is ramped up for the on-time $t_{on}$ (defined by the duty cycle) crosses the inductor current control signal $V_S$ at a unique point:

$$\Delta V_{HYST} = \Delta V_r + v_m = m_s' * t_{on} + m_l * t_{on}$$

By replacing:

$$m_s' = m_s * R_s = R_s \frac{V_{IN} - V_{OUT}}{L}$$

and by setting $m_l=k_2*V_{OUT}$, $\Delta V_{HYST}=k_1*V_{OUT}$ and $$k_2 = \frac{R_s}{L},$$

and by taking into account that for a buck converter the duty cycle $$D = \frac{t_{on}}{T_S} = \frac{V_{IN}}{V_{OUT}},$$

it may be shown that the switching frequency $$f_S = \frac{1}{T_S} = \frac{k_2}{k_1}$$

is constant.

Hence, based on the values of the current sensing resistor $R_s$ and the inductor L the slope parameter $$k_2 = \frac{R_s}{L}$$

may be determined. The slope parameter is used to set the slope $m_l$ of the ramp signal $V_m$, as $m_l=k_2*V_{OUT}$. It should be noted that the slope of the ramp signal $V_m$ changes along with the output voltage $V_{OUT}$. Based on the target value of the switching frequency $f_S$, the hysteresis parameter $k_1$ may be determined, as $$k_1 = \frac{k_2}{f_S}.$$

The hysteresis parameter $k_1$ may be used to set the hysteretic voltage $\Delta V_{HYST}=k_1*V_{OUT}$.

In case of a variation of the input voltage $V_{IN}$ and/or of the output voltage $V_{OUT}$, the hysteretic voltage $\Delta V_{HYST}$ and the slope my of the ramp signal $V_m$ will be automatically adjusted such that the switching frequency $f_S$ remains constant at the target value $$\frac{k_2}{k_1}.$$

Furthermore, it can be shown that a perturbation of the inductor current is recovered within a few cycles due to the introduction of the ramp signal $V_m$ having a slope my as specified herein.

As illustrated in FIG. 1B, the ramp signal $V_m$ may be applied to the valley comparator. A ramp generator having a slope equal to the inductor current magnetizing slope may be added, such that the ramp signal has a slope proportional to $V_{IN}$-$V_{OUT}$. A clock at frequency fs, which is the desired switching frequency, starts the ramp. The hysteretic voltage may be proportional to $V_{IN}$-$V_{OUT}$.

By introducing the ramp signal at the target value of the switching frequency in the control signal, the system tries to follow this target value. The error amplifier may be applied on the peak control side. The ramp signal is added to the hysteretic voltage on the valley control side as shown in FIG. 1B. The inductor current $i_L$ is sensed on the inductor and converted to the voltage $V_s$ via the transresistance $R_s$. The voltage signal $V_s$ is compared to the controlling peak and valley references. The controlling peak reference is in this case controlled directly by the error amplifier. The controlling valley reference is the difference between the error amplifier voltage shifted by the hysteretic voltage $\Delta V_{HYST}$ and the ramp signal. The ramp signal may be generated such that its slope $m_1$ is equal to the inductor current slope during magnetization, i.e. it may be proportional to $V_{IN}$-$V_{OUT}$. A clock signal, running at the target value of the switching frequency $f_s$, starts the ramp periodically. When the inductor current ramps up, the voltage $V_s$ ramps up in a similar manner until $V_s$ reaches the peak reference $V_{c\_pk}$. This condition triggers the output $I_{PK\_cmp}$ of the peak comparator $PK_{comp}$. The logic then forces PWM=Low which turns off the electronic switch HS and which turns on the electronic switch LS. Consequently, the inductor current decreases with a certain slope $m_o$ and when its sensed version $V_S$ reaches the valley reference $V_{c\_VLY}$, by intercepting the added ramp, the output $I_{VLY\_cmp}$ of the valley comparator $VLY_{comp}$ triggers. The logic then forces PWM=high which turns off the electronic switch LS and turns on the electronic switch HS. This is repeated periodically at the switching frequency $f_s$. The artificial ramp signal is added to the hysteretic voltage on the valley control side.

Figure 2B:
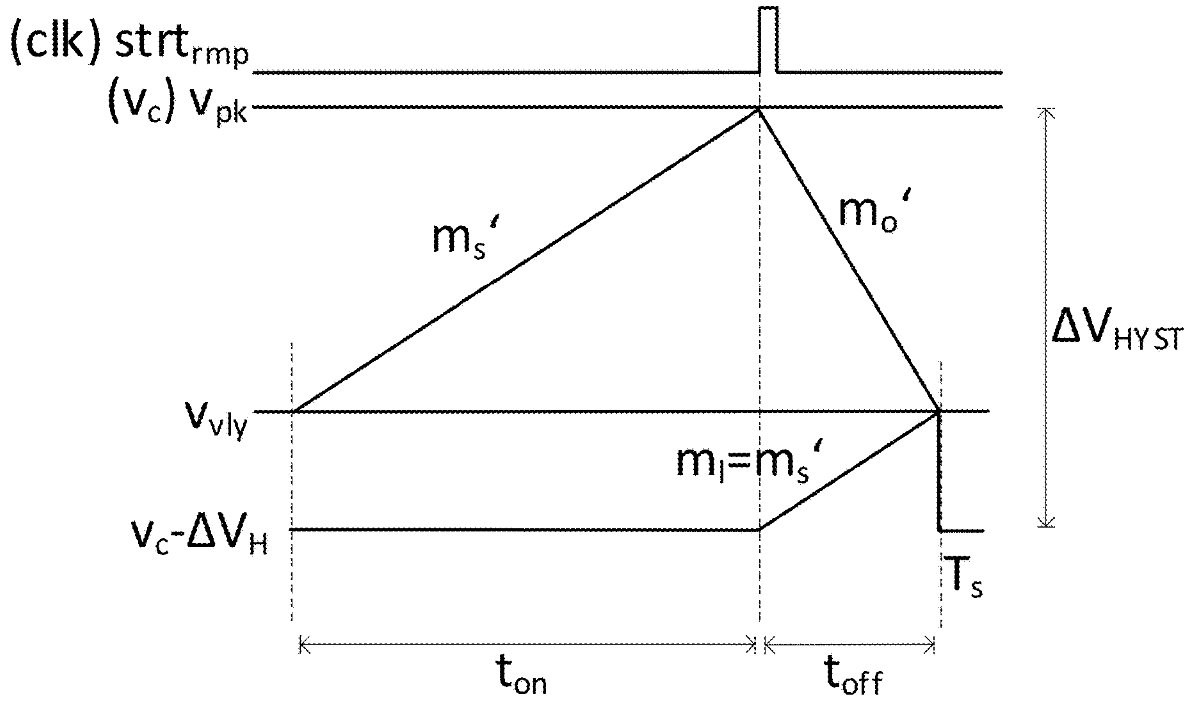
FIGS. 2B and 3B show example waveform diagrams for the power converter of FIG. 1B.

The waveforms of one switching period are illustrated in FIG. 2B. The sensed inductor current has a ripple $\Delta V_r$, the added ramp has a slope $m_1$ and the clock starts the added ramp (at the occurrence of a peak current event). The added ramp has a slope $m_1$ for a certain off-time $t_{off}$ (defined by the buck duty cycle law) and cross the inductor current control signal at a unique point:

$$\Delta V_{HYST} = v_m + \Delta V_r = m_l * t_{off} + m_o' * t_{off}$$

using

-continued $$m_o' = m_o * R_s = R_s \frac{V_{OUT}}{L}$$

and $m_l = k_2^*(V_{IN} - V_{OUT})$, $\Delta V_{HYST} = k_1^*(V_{IN} - V_{OUT})$ and $k_2 = \frac{R_s}{L}$, the switching frequency has a constant value $$f_s = \frac{k_2}{k_1}.$$

It should be noted that the scheme which is described in the present document is not limited to buck converter operation, but can also be applied to boost and inverting buck-boost converter topologies. The control rules which may be applied are

- add a ramp signal on the valley (or the peak) having a slope which is proportional to the magnetizing (or demagnetizing) voltage, wherein the ramp signal is periodically started by a clock signal having the target switching frequency fs.
- generate a hysteresis that is proportional to the same magnetizing (or demagnetizing) voltage.

It should be noted that the slope of the ramp signal may be chosen to be proportional to the magnetizing voltage, even when the ramp signal is applied on the peak control side (as illustrated in FIG. 1B). In this case, it is possible to set a point of time, at which the ramp signal starts, by setting an additional constraint on the hysteresis. In this case the hysteresis is typically not proportional to $V_{IN}$, $V_{OUT}$ or their combination, but may be determined using a (relatively complex) function of $V_{IN}$ and $V_{OUT}$.

Figure 3A:
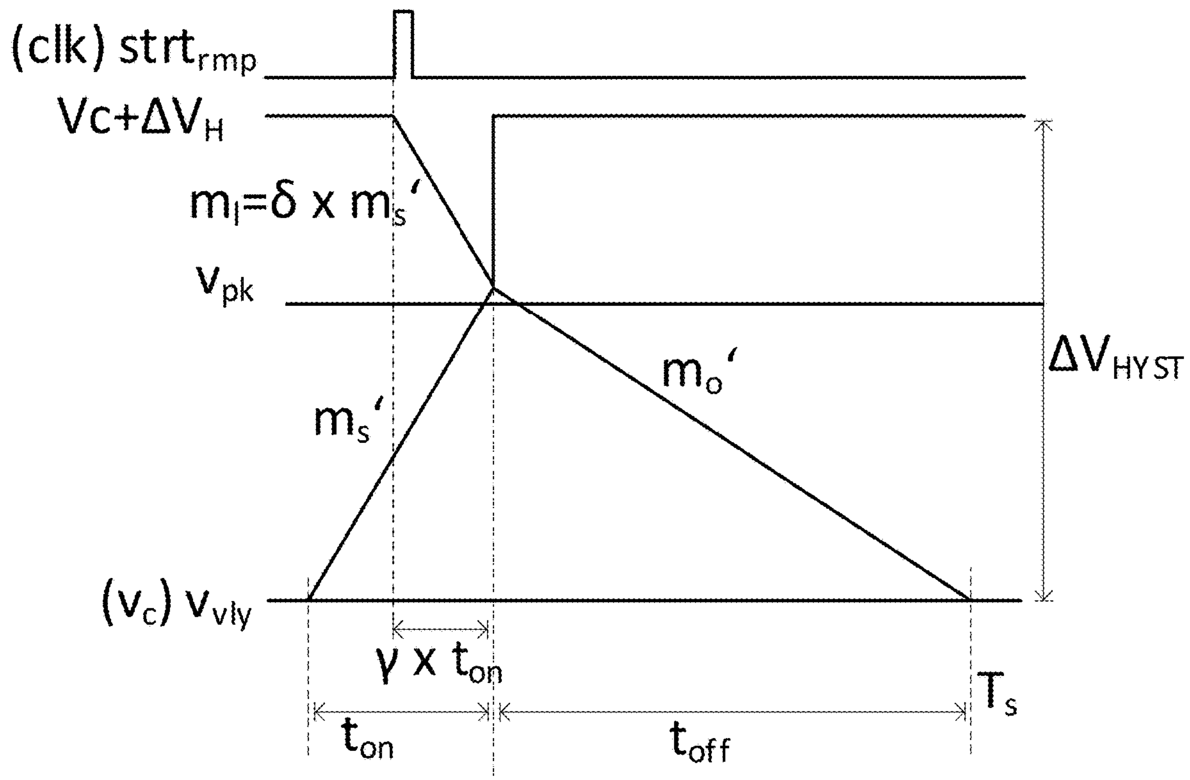

Reference is made to FIG. 3A. The slope $m_1$ of the ramp signal may be set to be proportional to the slope $m_s$ of the inductor current by a factor δ. Hence, the slope of the ramp signal may be set to be proportional to $V_{IN}$-$V_{OUT}$. By setting the hysteresis factor $k_1$ to a certain value, the start of the ramp is forced to occur at a certain portion γ of the on-time $t_{on}$.

The error amplifier may be applied on the valley side. The artificial ramp may be subtracted from the hysteretic voltage on the peak control side as shown in FIG. 1A. The inductor current $i_L$ is sensed on the inductor and converted to a voltage $V_s$ using the transresistance $R_s$. The voltage signal $V_S$ is compared to the controlling peak and valley references. The controlling valley reference is controlled directly by the error amplifier. The controlling peak reference is the difference between the error amplifier voltage, shifted by the hysteretic voltage $\Delta V_{HYST}$, and the ramp signal. The ramp signal may be generated such that its slope $m_1$ is proportional to $V_{IN}$-$V_{OUT}$. A clock signal, running at the target switching frequency $f_s$, starts the ramp periodically. When the inductor current ramps up, the voltage $V_s$ also ramps up until $V_s$ reaches the peak reference $V_{c\_pk}$, by intercepting the added ramp. This condition triggers the output $I_{PK\_cmp}$ of comparator $PK_{comp}$. The logic forces PWM=Low which turns off the electronic switch HS and turns on the electronic switch LS. Consequently, the inductor current decreases with a certain slope $m_o$ and when its sensed version $V_S$ reaches the valley reference $V_{c\_VLY}$, the output $I_{VLY\_cmp}$ of comparator $VLY_{comp}$ triggers. The logic then forces PWM=high which turns off the electronic switch LS and turns on the electronic switch HS. This may be repeated periodically at the target switching frequency $f_s$. FIG. 3A shows the sensed inductor current having a ripple $\Delta V_r$, the added ramp signal having a slope $m_1$ and the clock signal that starts the added ramp.

The added ramp has a slope $m_1$, wherein after a certain time $t_r=\gamma^* t_{on}$ (defined by the hysteresis) the ramp signal crosses the inductor current control signal at a unique point:

$$\Delta V_{HYST} = \Delta V_r + v_m = m_s' * t_{on} + m_l * t_r$$

Using $$m_s' = m_s * R_s = R_s \frac{V_{IN} - V_{OUT}}{L}$$

one obtains $$m_l = \delta * m_s' = k_2^*(V_{IN} - V_{OUT}), \text{ with } 0 < \delta \le 1$$

$$k_2 = \delta * \frac{R_s}{L}$$

$$\Delta V_{HYST} = k_1^*(V_{IN} - V_{OUT})\frac{V_{OUT}}{V_{IN}}$$

$$k_1 = (\gamma * \delta + 1) * \frac{R_s}{f_s L}$$

$$t_r = \gamma * t_{on}, \text{ with } 0 < \gamma \le 1$$

If there is a variation of the conditions $V_{IN}$, $V_{OUT}$, the voltage hysteresis $\Delta V_{HYST}$ and the ramp slope automatically adjust such that the switching frequency fs is constant.

Figure 3B:
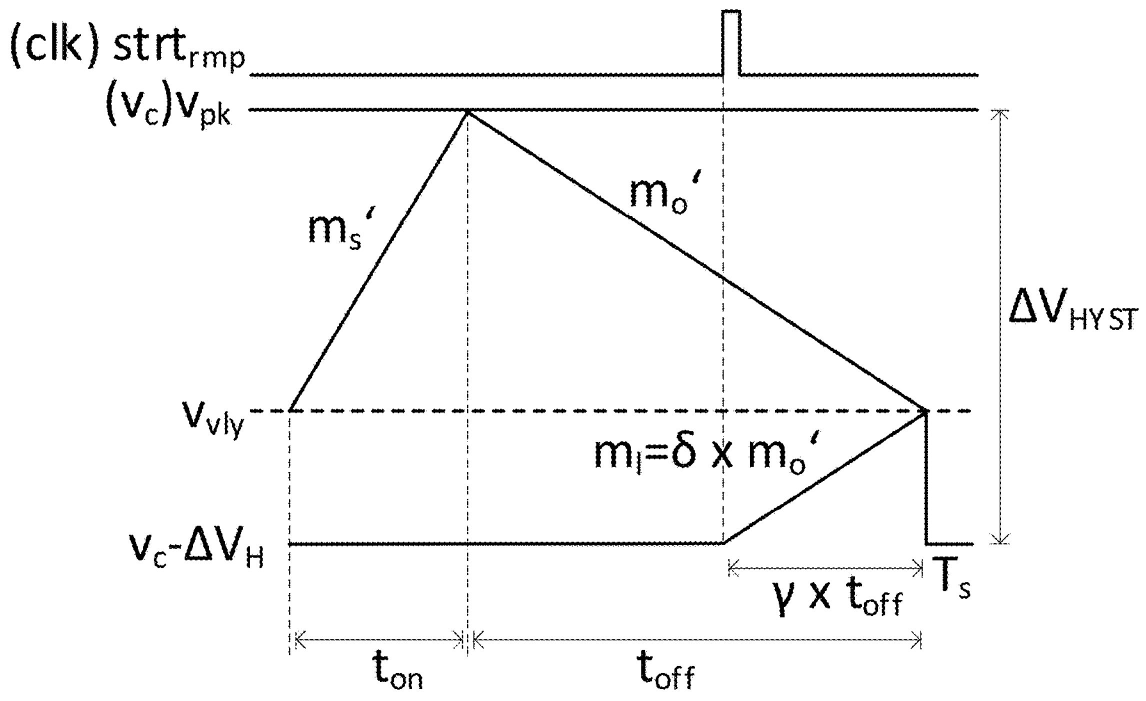

In a similar manner, the slope of the ramp signal may be selected to be proportional to the demagnetizing voltage when the ramp is applied on the valley side (as illustrated in FIG. 1B). In this case, the point of time at which the ramp starts may be set by setting a certain constraint on the hysteresis. The slope $m_1$ of the ramp signal may be proportional to $m_o$ by a factor δ, such that the slope is proportional to $V_{OUT}$. By setting the hysteresis factor to a certain value, the start of the ramp may be set to occur at a certain portion γ of $t_{off}$ (as illustrated in FIG. 3B).

The error amplifier may be applied on the peak side (as shown in FIG. 1B). The artificial ramp is added to the hysteretic voltage on the valley control side. The inductor current it is sensed on the inductor and converted to a voltage $V_s$ through the transresistance $R_s$. The voltage signal $V_s$ is compared to the controlling peak and valley references. The controlling peak reference is controlled directly by the error amplifier. The controlling valley reference is the difference between the error amplifier voltage shifted by the hysteretic voltage $\Delta V_{HYST}$, and the ramp. The ramp is generated such that its slope $m_1$ is proportional to the inductor current slope during demagnetization, i.e. it is proportional to $V_{OUT}$. A clock signal, running at the frequency $f_s$, starts the ramp periodically. When the inductor current ramps up, the voltage $V_s$ also ramps up until $V_s$ reaches the peak reference $V_{c\_pk}$. This condition triggers the output $I_{PK\_cmp}$ of comparator $PK_{comp}$. The logic forces PWM=Low which turns off the electronic switch HS and which turns on the electronic switch LS. Consequently, the inductor current decreases with a certain slope $m_o$ and when its sensed version $V_S$ reaches the valley reference $V_{c\_VLY}$, by intercepting the added ramp, the output $I_{VLY\_cmp}$ of comparator $VLY_{comp}$ triggers. The logic then forces PWM=high which turns off the electronic switch LS and turns on the electronic switch HS. This may be repeated periodically at the frequency $f_s$. The artificial ramp is added to the hysteretic voltage on the valley control side. FIG. 3B shows the sensed inductor current having a ripple $\Delta V_r$, the added ramp having a slope $m_1$ and the clock that starts the added ramp.

The added ramp has a slope $m_1$ that after a certain time $t_r=\gamma^* t_{off}$ (defined by the hysteresis) will cross the inductor current control signal at a unique point:

$$\Delta V_{HYST} = \Delta V_r + v_m = m_o' * t_{off} + m_l * t_r$$

$$m_o' = m_o * R_s = R_s \frac{V_{OUT}}{L}$$

$$m_l = \delta * m_o' = k_2 * V_{OUT}, \text{ with } 0 < \delta \le 1$$

$$k_2 = \delta * \frac{R_s}{L}$$

$$\Delta V_{HYST} = k_1^*(V_{IN} - V_{OUT})\frac{V_{OUT}}{V_{IN}}$$

$$k_1 = (\gamma * \delta + 1) * \frac{R_s}{f_s L}$$

$$t_r = \gamma * t_{off}, \text{ with } 0 < \gamma \le 1$$

The control scheme outlined in the context of FIGS. 3A and 3B allows the clock to occur at a point of time during the on-time ton or during the off-time toff. Hence, the clock phase may change and/or may be selected in a flexible manner. This control scheme may therefore be referred to as "Flexible clock phase". For this scheme, the hysteresis voltage is a relatively complex function of $V_{IN}$ and $V_{OUT}$.

The control scheme outlined in the context of FIGS. 2A and 2B sets the clock to the beginning of the on-time ton or the off-time toff. This allows the hysteresis voltage to be proportional to the slope of the inductor current (and to $V_{IN}$ and/or $V_{OUT}$). This control scheme may therefore be referred to as "Proportional Hysteresis".

The control scheme may be applied to other non-isolated converters having current mode control (such as Boost and Inverting Buck-boost topologies). Furthermore, the control scheme may be applied to isolated converters having current mode control, such as a Flyback converter, a Forward converter, etc.

Figure 4:
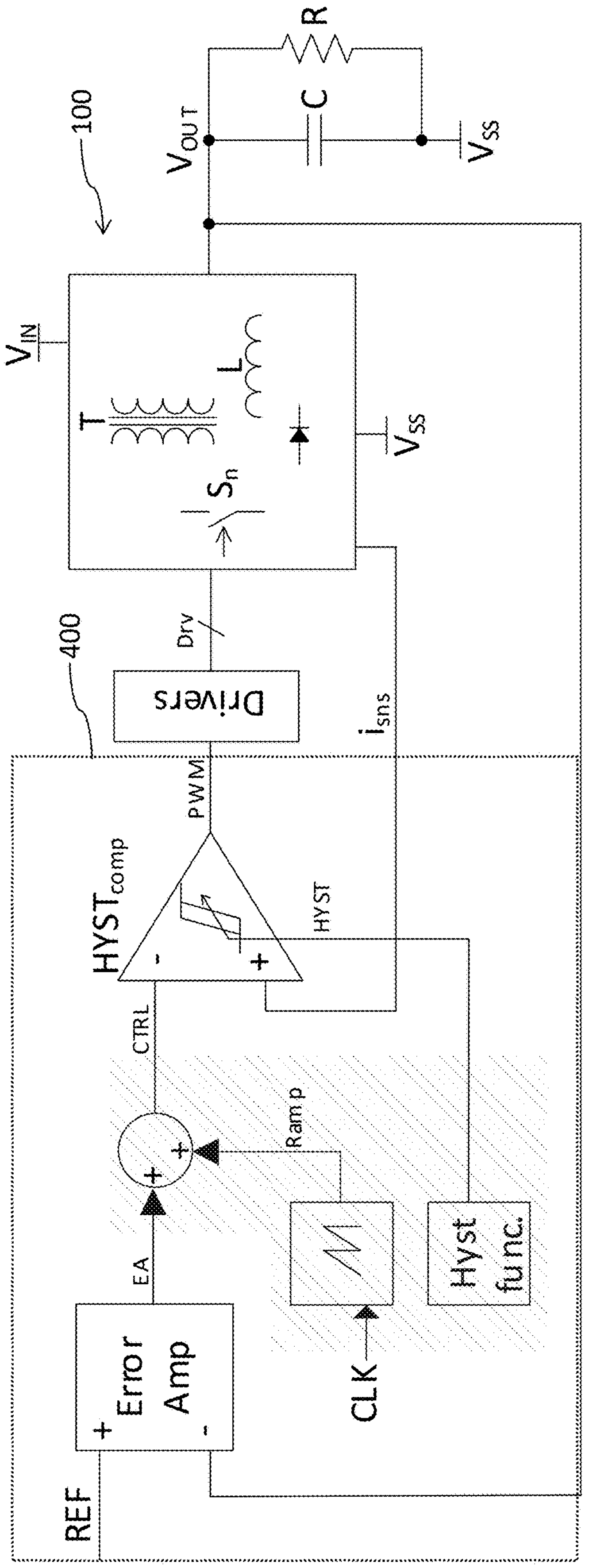
FIG. 4 shows a generic power converter.

FIG. 4 shows a diagram of a generic power converter 100 with a control unit 400 for performing a current mode control of the power converter 100.

The outputs $\Delta V_{HYST}$ and $m_1$ are defined in the following table:

TABLE 1

| Ramp | Proportional Hysteresis | | Flexible clock phase | |
|---|---|---|---|---|
| control | valley | peak | valley | peak |
| $\Delta V_{HYST}$ | $k_1$* $m_s$*L | $k_1$* $m_o$*L | $k_1$*L*$m_s$*$m_o$/($m_s$ + $m_o$) | $k_1$*L*$m_s$*$m_o$/($m_s$ + $m_o$) |
| $m_1$ | $m_s'$ | $m_o'$ | δ*$m_o'$ | δ*$m_s'$ |

TABLE 1-continued

| Ramp | Proportional Hysteresis | | Flexible clock phase | |
|---|---|---|---|---|
| control | valley | peak | valley | peak |
| $k_1$ | $R_s/(f_s*L)$ | $R_s/(f_s*L)$ | $(\gamma*\delta+1)*R_s/(f_s*L)$ | $(\gamma*\delta+1)*R_s/(f_s*L)$ |
| $t_r$ | $t_{off}$ | $t_{on}$ | $\gamma*t_{off}$ | $\gamma*t_{on}$ |

Figure 5:
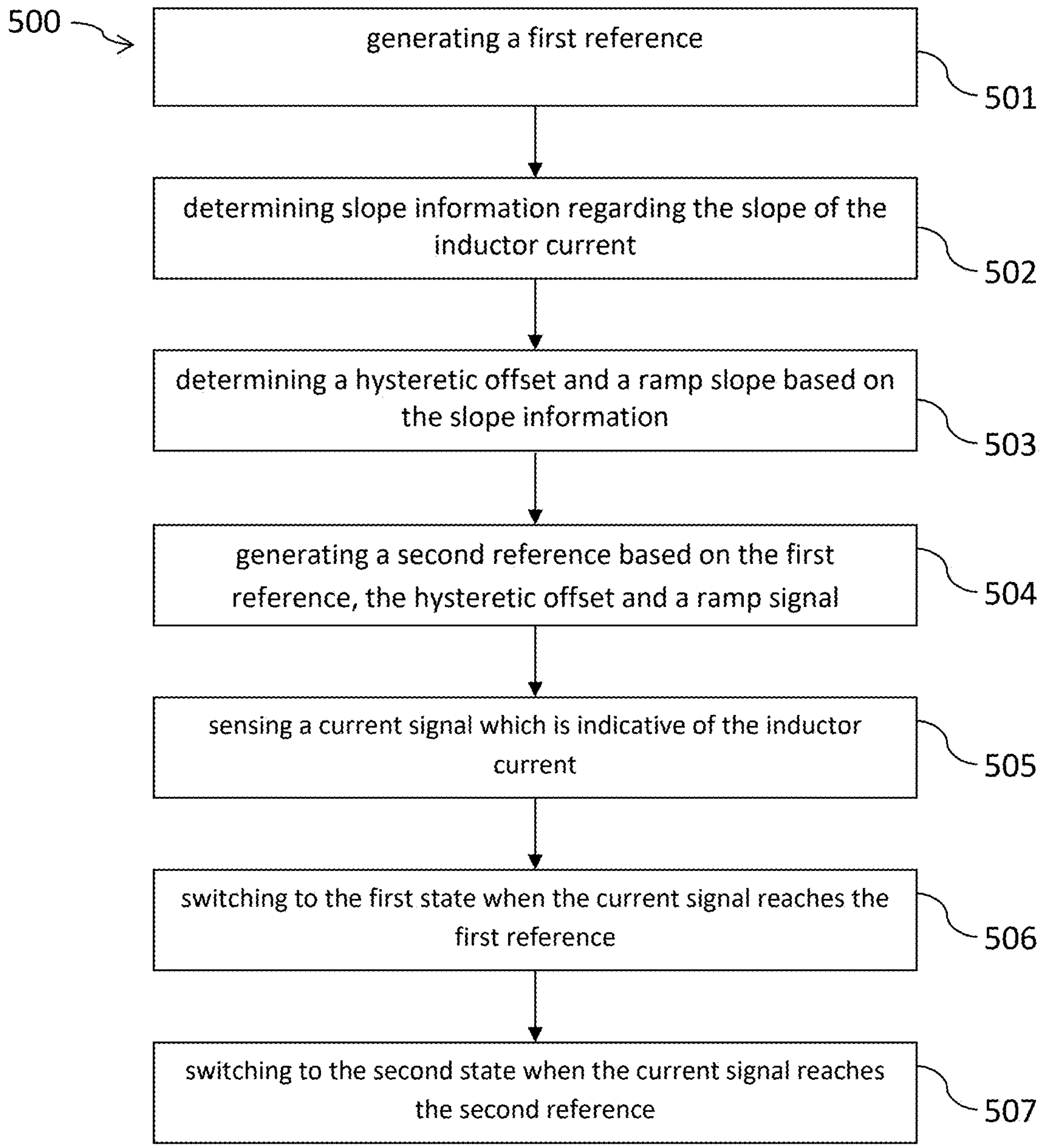
FIG. 5 shows a flow chart of a method for controlling a power converter.

FIG. 5 shows a flow chart of an example method 500 for operating a switched power converter 100 configured to provide an output voltage at an output node in dependence of an input voltage at an input node using a switching network which is configured to operate an inductance, notably an inductor, in a first state and in a second state. The first state may be one of the magnetizing state or the demagnetizing state. The second state may be the other one of the magnetizing state or the demagnetizing state. The current through the inductance, notably the inductor current, may exhibit a first slope in the first state and a second slope in the second state. The method 500 is typically executed repeatedly at a sequence of time instants.

The method 500 comprises generating 501 a first reference based on the output voltage and based on a reference voltage for the output voltage. The first reference may be determined based on the difference between the output voltage and the reference voltage. The first reference may correspond to the error signal.

Furthermore, the method 500 comprises determining 502 slope information with respect to the first slope and/or the second slope. The slope information may be determined based on the input voltage and/or based on the output voltage.

In addition, the method comprises determining 503 a hysteretic offset and the ramp slope of a ramp signal based on the slope information. The hysteretic offset $\Delta V_{HYST}$ and/or the ramp slope $m_1$ may be determined using the formulas given in Table 1.

The method 500 further comprises generating 504 a second reference based on the first reference, based on the hysteretic offset and based on the ramp signal.

Furthermore, the method 500 comprises providing 505 a current signal which is indicative of the current through the inductance.

In addition, the method 500 comprises causing 506 the switching network to put the inductance into the first state, if the current signal reaches the first reference, and/or causing 507 the switching network to put the inductance into the second state, if the current signal reaches the second reference.

Hence, a control unit 400 for operating a switched power converter 100 configured to provide an output voltage at an output node in dependence of an input voltage at an input node using a switching network which is configured to operate an inductance, notably through an inductor, in a first state and in a second state is described. The current through the inductance exhibits a first slope in the first state and a second slope in the second state. The switching network may comprise a high-side switch HS and a low-side switch LS.

The power converter 100 may comprise a buck converter, a boost converter, a buck-boost converter, an inverting buck-boost converter, and/or an isolated converter such as a Flyback converter and/or a Forward converter.

The control unit 400 is configured to generate a first reference based on the output voltage and based on a reference voltage. The first reference may correspond to the error signal. The first reference may be the valley reference or the peak reference.

Furthermore, the control unit 400 is configured to determine slope information with respect to the first slope and/or the second slope. The slope information may be determined based on the input voltage and/or based on the output voltage. Furthermore, the value of the inductance may be taken into account.

The control unit 400 is further configured to determine a hysteretic offset $\Delta V_{HYST}$ and the ramp slope $m_l$ of a ramp signal $V_m$ based on the slope information. For this purpose, one or more formulas of Table 1 may be used.

In addition, the control unit 400 is configured to generate a second reference based on the first reference, based on the hysteretic offset $\Delta V_{HYST}$ and based on the ramp signal $V_m$. The second reference may be the valley reference or the peak reference.

The control unit 400 may be configured to generate the second reference by adding the hysteretic offset $\Delta V_{HYST}$ to the first reference and by subtracting the ramp signal $V_m$ from the first reference. In this case, the first reference may correspond to the valley of the current signal (i.e. to the valley reference) and the second reference may correspond to the peak of the current signal (i.e. to the peak reference). In this case, the formulas from the columns marked as "peak" of Table 1 may be applicable for determining the hysteretic offset $\Delta V_{HYST}$ and the ramp slope $m_l$.

Alternatively, the control unit 400 may be configured to generate the second reference by subtracting the hysteretic offset $\Delta V_{HYST}$ from the first reference and by adding the ramp signal $V_m$ from the first reference. In this case, the first reference may correspond to the peak of the current signal (i.e. to the peak reference) and the second reference may correspond to the valley of the current signal (i.e. to the valley reference). In this case, the formulas from the columns marked as "valley" of Table 1 may be applicable for determining the hysteretic offset $\Delta V_{HYST}$ and the ramp slope $m_l$.

Furthermore, the control unit 400 is configured to provide a current signal $V_S$ which is indicative of the current through the inductance. The current signal $V_S$ may be sensed using a sensing resistor $R_S$.

If the first reference corresponds to the valley of the current signal $V_S$ and the second reference corresponds to the peak of the current signal $V_S$, the current signal may rise with the first slope $$m'_s$$

from the valley to the peak of the current signal $V_S$ may fall with the second slope $$m'_o$$

from the peak to the valley.

On the other hand, if the first reference corresponds to the peak of the current signal $V_S$ and the second reference corresponds to the valley of the current signal $V_S$, the current signal $V_S$ may fall with the first slope $$m'_o$$

from the peak to the valley and the current signal $V_S$ may rise with the second slope $$m'_s$$

from the valley to the peak.

The current signal $V_S$ may be compared to the first and/or the second reference (e.g. using a peak comparator and/or a valley comparator). Furthermore, the control unit 400 may be configured to cause the switching network to put the inductance into the first state, if the current signal reaches the first reference, and/or to cause the switching network to put the inductance into the second state, if the current signal reaches the second reference.

The control unit 400 may be configured to determine the hysteretic offset $\Delta V_{HYST}$ based on the slope information, such that the hysteretic offset $\Delta V_{HYST}$ is proportional to the first slope. Furthermore, the control unit 400 may be configured to determine the hysteretic offset $\Delta V_{HYST}$ based on the slope information, such that the hysteretic offset $\Delta V_{HYST}$ is independent of the second slope.

The control unit 400 may be configured to determine the hysteretic offset $\Delta V_{HYST}$ such that the hysteretic offset $\Delta V_{HYST}$ is proportional to the first slope by an offset proportionality factor which is dependent on the target value of the switching frequency $f_s$ for switching the inductance between the first state and the second state. In particular, the control unit 400 may be configured to determine the hysteretic offset such that the hysteretic offset $$\Delta V_{HYST} = m'_x / f_s;$$

wherein $$m'_x$$

is the first slope. As indicated above, the first slope $$m'_x$$

may be $$m'_o$$

(for the "valley" case) or $$m'_s$$

(for the "peak" case).

Furthermore, the control unit 400 may be configured to determine the ramp slope $m_l$ based on the slope information, such that the ramp slope $m_l$ is proportional to the first slope (and possibly independent of the second slope). The ramp slope may be equal to the first slope, i.e.

$$m_l = m'_x.$$

The first slope $$m'_x$$

may be $$m'_o$$

(for the "valley" case) or $$m'_s$$

(for the "peak" case).

The control unit 400 may be configured to generate a clock signal at the target value of the switching frequency $f_s$ for switching the inductance between the first state and the second state. Furthermore, the control unit 400 may be configured to restart the ramp signal in dependence of the clock signal and/or at each transition from the second state to the first state.

By doing this, a particularly stable switching frequency may be achieved during hysteretic current mode control.

Alternatively, the control unit 400 may be configured to determine the hysteretic offset $\Delta V_{HYST}$ based on the slope information, such that the hysteretic offset is a function of the first slope and of the second slope. In particular, the control unit 400 may be configured to determine the hysteretic offset $\Delta V_{HYST}$ such that the hysteretic offset $\Delta V_{HYST}$ is proportional to the function of the first slope and of the second slope by an offset proportionality factor which is dependent on the target value of the switching frequency $f_s$ for switching the inductance between the first state and the second state.

In particular, the control unit 400 may be configured to determine the hysteretic offset $\Delta V_{HYST}$ such that the hysteretic offset $\Delta V_{HYST}$ is proportional to $1/f_s$. The hysteretic offset $\Delta V_{HYST}$ may be determined such that the hysteretic offset $$\Delta V_{HYST} = \frac{\gamma * \delta + 1}{f_s} * \frac{m'_s m'_0}{m'_s + m'_0};$$

wherein $$m'_s$$

is one of the first slope or the second slope and $$m'_0$$

is the other one of the first slope and the second slope; wherein γ is a time factor with 0<γ≤1, and wherein δ is a proportionality factor, with 0<δ≤1.

Furthermore, the control unit 400 may be configured to determine the ramp slope $m_l$ based on the slope information, such that the ramp slope is proportional to the second slope (and possibly independent of the first slope). The ramp slope $m_l$ may be proportional to the second slope by the proportionality factor δ, with 0<δ≤1. The second slope may be $$m'_s$$

(for the "valley" case) or $m'_o$ (for the "peak" case).

The control unit 400 may be configured to generate the clock signal at the target value of a switching frequency $f_s$ for switching the inductance between the first state and the second state, and to restart the ramp signal in dependence of the clock signal and/or at a restart time instant which follows a transition from the second state to the first state. The restart time instant may be determined in dependence of the time factor γ, notably such that the restart time instant corresponds to the transition from the second state to the first state if γ=0 and such that the restart time instant corresponds to the subsequent transition from the first state to the second state if γ=1.

By doing this, a stable switching frequency may be achieved during hysteretic current mode control in a flexible manner.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A control unit for operating a switched power converter configured to provide an output voltage at an output node in dependence of an input voltage at an input node using a switching network which is configured to operate an inductance in a first state and in a second state; wherein a current through the inductance exhibits a first slope in the first state and a second slope in the second state; wherein the control unit is configured to generate a first reference based on the output voltage and based on a reference voltage;

determine slope information with respect to the first slope and/or the second slope;

determine a hysteretic offset and a ramp slope of a ramp signal based on the slope information;

generate a second reference based on the first reference, based on the hysteretic offset, and based on the ramp signal;

provide a current signal which is indicative of the current through the inductance;

cause the switching network to put the inductance into the first state, if the current signal reaches the first reference; and cause the switching network to put the inductance into the second state, if the current signal reaches the second reference.

2. The control unit of claim 1, wherein the control unit is configured to:

generate the second reference by adding the hysteretic offset to the first reference and by subtracting the ramp signal from the first reference, such that the first reference corresponds to a valley of the current signal and the second reference corresponds to a peak of the current signal; or generate the second reference by subtracting the hysteretic offset from the first reference and by adding the ramp signal from the first reference, such that the first reference corresponds to a peak of the current signal and the second reference corresponds to a valley of the current signal.

3. The control unit of claim 2, wherein:

if the first reference corresponds to the valley of the current signal and the second reference corresponds to the peak of the current signal, the current signal rises with the first slope from the valley to the peak and the current signal falls with the second slope from the peak to the valley; and if the first reference corresponds to the peak of the current signal and the second reference corresponds to the valley of the current signal, the current signal falls with the first slope from the peak to the valley and the current signal rises with the second slope from the valley to the peak.

4. The control unit of claim 2, wherein the control unit is configured to:

determine the hysteretic offset based on the slope information, such that the hysteretic offset is proportional to the first slope; and determine the ramp slope based on the slope information, such that the ramp slope is proportional to the first slope.

5. The control unit of claim 4, wherein the control unit is configured to determine the hysteretic offset based on the slope information, such that the hysteretic offset and the slope ramp are independent of the second slope.

6. The control unit of claim 4, wherein the control unit is configured to:

determine the hysteretic offset such that the hysteretic offset is proportional to the first slope by an offset proportionality factor which is dependent on a target value of a switching frequency for switching the inductance between the first state and the second state; and determine the ramp slope such that the ramp slope is equal to the first slope.

7. The control unit of claim 6, wherein the control unit is configured to:

determine the hysteretic offset such that the hysteretic offset is:

$$\Delta V_{HYST} = m'_x / f_s;$$

wherein $$m'_x$$

is the first slope and wherein $f_s$ is the target value of the switching frequency; and determine the ramp slope such that the ramp slope $$m_l = m'_x.$$

8. The control unit of claim 1, wherein the control unit is configured to:

generate a clock signal at a target value of a switching frequency for switching the inductance between the first state and the second state; and restart the ramp signal in dependence of the clock signal and/or at each transition from the second state to the first state.

9. The control unit of claim 2, wherein the control unit is configured to:

determine the hysteretic offset based on the slope information, such that the hysteretic offset is a function of the first slope and of the second slope; and determine the ramp slope based on the slope information, such that the ramp slope is proportional to the second slope.

10. The control unit of claim 9, wherein the control unit is configured to determine the slope ramp based on the slope information, such that the slope ramp is independent of the first slope.

11. The control unit of claim 9, wherein the control unit is configured to:

determine the hysteretic offset such that the hysteretic offset is proportional to the function of the first slope and of the second slope by an offset proportionality factor which is dependent on a target value of a switching frequency for switching the inductance between the first state and the second state; and/or determine the ramp slope such that the ramp slope is proportional to the second slope by a proportionality factor ($\delta$), with $0<\delta\leq 1$.

12. The control unit of claim 11, wherein the control unit is configured to determine the hysteretic offset such that the hysteretic offset ($\Delta V_{HYST}$) is proportional to $1/f_s$; wherein $f_s$ is the target value of the switching frequency.

13. The control unit of claim 12, wherein the control unit is configured to determine the hysteretic offset such that the hysteretic offset is:

$$\Delta V_{HYST} = \frac{(\gamma * \delta + 1)}{f_s} * \frac{m'_s m'_0}{m'_s + m'_0};$$

wherein $$m'_s$$

is one of the first slope or the second slope and $$m'_0$$

is the other one of the first slope and the second slope; wherein $\gamma$ is a time factor with $0<\gamma\leq 1$.

14. The control unit of claim 13, wherein the control unit is configured to:

generate a clock signal at a target value of a switching frequency ($f_s$) for switching the inductance between the first state and the second state; and restart the ramp signal in dependence of the clock signal and/or at a restart time instant which follows a transition from the second state to the first state.

15. The control unit of claim 14, wherein the control unit is configured to determine the restart time instant in dependence of the time factor ($\gamma$), such that the restart time instant corresponds to the transition from the second state to the first state if $\gamma=0$ and such that the restart time instant corresponds to the subsequent transition from the first state to the second state if $\gamma=1$.

16. The control unit of claim 1, wherein the power converter comprises a buck converter, a boost converter, a buck-boost converter, an inverting buck-boost converter, a Flyback converter and/or a Forward converter.

17. A method for operating a switched power converter configured to provide an output voltage at an output node in dependence of an input voltage at an input node using a switching network which is configured to operate an inductance in a first state and in a second state; wherein a current through the inductance exhibits a first slope in the first state and a second slope in the second state; the method comprising:

generating a first reference based on the output voltage and based on a reference voltage;

determining slope information with respect to the first slope and/or the second slope;

determining a hysteretic offset and a ramp slope of a ramp signal based on the slope information;

generating a second reference based on the first reference, based on the hysteretic offset and based on the ramp signal;

providing a current signal which is indicative of the current through the inductance;

causing the switching network to put the inductance into the first state, if the current signal reaches the first reference; and causing the switching network to put the inductance into the second state, if the current signal reaches the second reference.

18. The method of claim 17, further comprising:

generating the second reference by adding the hysteretic offset to the first reference and by subtracting the ramp signal from the first reference, such that the first reference corresponds to a valley of the current signal and the second reference corresponds to a peak of the current signal; or generating the second reference by subtracting the hysteretic offset from the first reference and by adding the ramp signal from the first reference, such that the first reference corresponds to a peak of the current signal and the second reference corresponds to a valley of the current signal.

19. The method of claim 18, wherein:

if the first reference corresponds to the valley of the current signal and the second reference corresponds to the peak of the current signal, the current signal rises with the first slope from the valley to the peak and the current signal falls with the second slope from the peak to the valley; and if the first reference corresponds to the peak of the current signal and the second reference corresponds to the valley of the current signal, the current signal falls with the first slope from the peak to the valley and the current signal rises with the second slope from the valley to the peak.

20. The method of claim 18, further comprising:

determining the hysteretic offset based on the slope information, such that the hysteretic offset is proportional to the first slope; and determining the ramp slope based on the slope information, such that the ramp slope is proportional to the first slope.

* * * * *